(12) United States Patent
Breault

(10) Patent No.: US 10,418,640 B2
(45) Date of Patent: Sep. 17, 2019

(54) METHOD OF MANUFACTURING A DRY-LAID FUEL CELL PRECURSOR SUBSTRATE AND A SUBSTRATE

(71) Applicant: Audi AG, Ingolstadt (DE)

(72) Inventor: Richard D. Breault, North Kingston, RI (US)

(73) Assignee: AUDI AG, Ingolstadt (DE)

( * ) Notice: Subject to any disclaimer, the term of this patent is extended or adjusted under 35 U.S.C. 154(b) by 575 days.

(21) Appl. No.: 15/025,203

(22) PCT Filed: Dec. 9, 2013

(86) PCT No.: PCT/US2013/073829
§ 371 (c)(1),
(2) Date: Mar. 25, 2016

(87) PCT Pub. No.: WO2015/088472
PCT Pub. Date: Jun. 18, 2015

(65) Prior Publication Data
US 2016/0233518 A1  Aug. 11, 2016

(51) Int. Cl.
*H01M 4/88*  (2006.01)
*C04B 35/52*  (2006.01)
(Continued)

(52) U.S. Cl.
CPC ......... *H01M 4/8807* (2013.01); *C04B 35/522* (2013.01); *C04B 35/524* (2013.01);
(Continued)

(58) Field of Classification Search
CPC ............ H01M 4/8807; H01M 8/0243; H01M 8/0234; C04B 35/522; C04B 35/524; C04B 2235/5248; C04B 2235/48; Y02P 70/56
(Continued)

(56) References Cited

U.S. PATENT DOCUMENTS

| 4,165,349 A | 8/1979 | Sandelli |
| 4,426,340 A * | 1/1984 | Goller ............... B29C 43/222 264/29.1 |

(Continued)

FOREIGN PATENT DOCUMENTS

| CN | 13403963 A | 11/2013 |
| JP | 2010-15908 A | 1/2010 |

OTHER PUBLICATIONS

Balasubramanian et al., "New Christiansen filters," *Applied Optics* 31(10): 1574-1587, 1992.

*Primary Examiner* — Michael N Orlando
*Assistant Examiner* — Christian Roldan
(74) *Attorney, Agent, or Firm* — Seed IP Law Group LLP

(57) ABSTRACT

The method includes dispensing carbon fibers having a length of between about 3 and 12 millimeters from a first hopper into a raizing chamber of a double-hopper, bladed-roiler scattering machine and simultaneously depositing a thermoset resin powder from a second hooper of the scattering machine into the mixing chamber where in the fibers and powder are mixed to homogenous predetermined proportions of between about 40% and 60% each. Then, the mixture is directed to flew onto a moving support belt of a double belt press apparatus and the mixture is compressed between the moving support belt and a moving compression belt of the double belt press apparatus and the mixture passes between the belts for an adequate residence time duration to first melt and then cure the thermoset resin to form the fuel cell precursor substrate. Carbonizing and then graphitizing the precursor substrate forms the final substrate.

16 Claims, 2 Drawing Sheets

(51) Int. Cl.
*H01M 8/0234* (2016.01)
*H01M 8/0243* (2016.01)
*C04B 35/524* (2006.01)

(52) U.S. Cl.
CPC ....... *H01M 8/0234* (2013.01); *H01M 8/0243* (2013.01); *C04B 2235/48* (2013.01); *C04B 2235/5248* (2013.01); *Y02P 70/56* (2015.11)

(58) Field of Classification Search
USPC ...................................................... 264/29.1
See application file for complete search history.

(56) References Cited

U.S. PATENT DOCUMENTS

| | | | | |
|---|---|---|---|---|
| 4,851,304 A * | 7/1989 | Miwa | ...................... | H01M 4/96 |
| | | | | 429/534 |
| 6,454,978 B1 * | 9/2002 | Thielman | .............. | B29C 43/222 |
| | | | | 264/104 |
| 2007/0166524 A1 * | 7/2007 | Nakamura | .............. | C04B 35/83 |
| | | | | 428/292.1 |
| 2009/0151847 A1 * | 6/2009 | Zhamu | .................. | B29C 43/265 |
| | | | | 156/47 |
| 2010/0035126 A1 * | 2/2010 | Breault | .................... | D04H 1/42 |
| | | | | 429/532 |

* cited by examiner

METHOD OF MANUFACTURING A DRY-LAID FUEL CELL PRECURSOR SUBSTRATE AND A SUBSTRATE

TECHNICAL FIELD

The present invention relates to fuel cells that are suited for usage in transportation vehicles, portable power plants, or as stationary power plants, and the invention especially relates to a precursor substrate and a substrate for a fuel cell.

BACKGROUND ART

Fuel cells are well known and are commonly used to produce electrical power from hydrogen containing reducing fluid fuel and oxygen containing oxidant reactant streams to power electrical apparatus such as dispersed power generators and transportation vehicles. Low temperature proton exchange membrane ("PEM") or phosphoric acid fuel cells ("PAFC") utilize substrates as gas diffusion layers to support the catalyst layers. Configuration of the substrates is dependent upon the configuration of the cells. Most contemporary PEM & PAFC fuel cells have ribbed bi-polar separator plates with relatively thin flat substrates. An alternative cell design uses ribbed substrates with flat bi-polar plates. Such substrate designs are well known in the art and have benefits and drawbacks depending upon many manufacturing and operational factors.

It is known that substrates may be made by wet-laid paper making technology and by dry-laid paper or felt making technology. U.S. Pat. No. 4,851,304 that issued on Jul. 25, 1909 to Miwa et al. describes a common wet-laid process used to make a typical thin fuel cell substrate beginning with a wet-laid carbon paper. This process uses 6-12 millimeter ("mm") chopped carbon fibers to form a paper that is treated with a variety of thermoset resins, pressed to a controlled thickness, heated in an inert atmosphere to carbonize the resin. The wet-laid process is a multiple-step, complicated process that yields a thin substrate having satisfactory porosity rigidity and flexural strength for assembly into and operation within a fuel cell. The high flexural strength is primarily attributable to the 6-12 mm length of the carbon fibers.

U.S. Pat. No. 4,426,340 that issued on Jan. 17, 1984 to Goller et al. discloses a known dry-laid process that is less complex than the wet-laid process, but that results in a substrate having a lower flexural strength because the average carbon fiber length is about 0.2 mm. This dry-laid process includes mixing milled carbon fibers that are about 0.025 mm to about 0.46 mm in length with a thermoset resin powder; depositing the mixture onto a support belt of a double belt press apparatus, and then continuously compressing, molding and heating the mixture between the support belt and a compression belt to melt and cure the thermoset resin to produce a precursor substrate. The resulting precursor substrate is then trimmed, carbonized and graphitized to form a substrate for use in a fuel cell. This form of substrate, however, suffers from a low flexural strength because of the short lengths of the carbon fibers.

Problems arise with such dry-laid substrate manufacturing processes in utilizing longer carbon fibers. It is difficult to achieve a homogenous mixture with a resin or binder that affords acceptable porosity and flexural strength within the substrate. Manufacture of the substrate by an efficient dry-laid process has been limited to substrates made from very short milled carbon fibers due to an inability of known available powder feeders to uniformly distribute long fibers. The powder feeders used in known dry-laid fuel cell substrate manufacture consist of about a 90 mm brush rotating in the bottom a semi-circular hopper that is made from perforated metal. Longer carbon fibers create fiber balls that eventually block the perforations in the perforated metal. The short fibers result in a substrate with a low flexural strength which leads to excessive scrap rate during processing of the substrate into fuel cell electrodes. Additionally, known thermoset resin powders used in dry-laid substrate manufacturing processes that utilize a double belt press apparatus have cure times that range from 3 minutes to 15 minutes at 150 degrees Celsius ("° C.") which results in a requirement for a very costly, long double belt press apparatus.

SUMMARY OF THE DISCLOSURE

The disclosure is a method of manufacturing a dry-laid fuel cell precursor substrate and substrate. The method includes dispensing carbon fibers having a length of between about 3 and 12 millimeters from a first hopper into a mixing chamber of a double-hopper, bladed-roller scattering machine and, simultaneously with the depositing of the carbon fibers into the mixing chamber, depositing a thermoset resin powder, such as a phenolic resin powder, from a second hopper of the scattering machine into the mixing chamber. The carbon fibers and thermoset resin powder are mixed together so that the mixture includes between about forty percent and about sixty percent carbon fiber and between about forty percent and about sixty percent thermoset resin powder. Then, an adequate amount of the mixture is directed to flow onto a moving support belt of a double belt press apparatus to form a layer of the mixture on the moving support belt. Then, the mixture is compressed between the moving support belt and a moving compression belt of the double belt press apparatus while the mixture is simultaneously heated and compressed. The heated, compressed mixture passes between the belts an adequate distance along the double belt press apparatus to first melt and then cure the thermoset resin. The cured mixture then passes out of the double belt press apparatus as the precursor substrate.

The method of manufacturing the dry-laid substrate for a fuel cell may also include, after passing the cured mixture as the precursor substrate for a fuel cell out of the double belt press apparatus, trimming the precursor substrate to predetermined length and width dimensions. The precursor substrate is also typically carbonized by heating in an inert atmosphere to 750-1000° C. as is known. Additionally, the carbonized precursor substrate is generally graphitized to improve electrical and thermal conductivities and resistance to oxidation and corrosion by heating in an inert atmosphere to 2000-3000° C. as is known, to thereby form the finished substrate for a fuel cell. It is preferred to use a two-stage thermoset resin with a discrete melting temperature and a discrete curing temperature. The discrete melting temperature permits the resin to flow to the junctions between the compressed fibers due to surface tension forces prior to the resin being cured. This results in a more conductive and stronger structure.

The method may also include compressing the mixture to a predetermined thickness between the moving support belt and moving compression belt through a melt-zone of the double belt press apparatus, wherein the melt-zone includes moving the mixture during a time duration sufficient to heat the mixture above the melting point of the resin; and wherein the melt-zone also includes heating the mixture passing through the melt-zone at a temperature which is above a melting point of the resin and below a curing temperature of the resin. In passing the mixture through the double belt press apparatus, a critical variable is a thickness of the mixture. A predetermined thickness is selected so that a pressure applied to the mixture passing through the double belt press by the belts is between about 50 and about 100 psi or 350 to about 700 kPa. The double belt press is designed and selected and operated to exert such a required pressure on the mixture at selected, predetermined thickness. Additionally, the method preferably includes, after moving the mixture through the melt-zone, compressing the mixture to the predetermined thickness between the moving support belt and moving compression belt through a cure-zone of the double belt press apparatus. The cure-zone is adjacent and contiguous with the melt-zone and the cure-zone includes moving the mixture during a time duration sufficient to the cure resin, and simultaneously heating the mixture passing through the cure zone to a temperature in excess of the cure temperature of the resin.

In a further embodiment, the method of manufacturing the dry-laid substrate also includes agitating the carbon fibers within the first hopper with a moving agitator blade within the first hopper while dispensing the carbon fibers from the first hopper, and may also include agitating the thermoset resin powder within the second hopper with a moving agitator blade within the second hopper while depositing the thermoset resin from the second hopper into the mixing chamber.

In one aspect of the disclosure, the method includes use of the double-hopper, bladed-roller scattering machine so that the first hopper holds the 3-12 mm carbon fibers and the fibers are dispensed from the hopper onto an upper surface of a rotating bladed roller. The upper surface of the rotating bladed roller is secured immediately adjacent an outlet of the first hopper. The bladed roller rotates in a first rotational direction moving the carbon fibers from the hopper disposed above the bladed roller to positions between blades on the bladed roller. The carbon fibers move with the bladed roller in the first rotational direction. The double-hopper, bladed-roller machine may also include a doctor blade adjacent the outlet of the first hopper to regulate a flow rate of the carbon fibers from the first hopper onto the upper surface of the bladed roller, and also to cut any carbon fibers having lengths in excess of a predetermined maximum length, such as 12 mm.

A brush roller of the scattering machine brushes the carbon fibers off of a side surface of the bladed roller and onto a brush surface of the brush roller. The side surface of the bladed roller is disposed about ninety degrees from the upper surface and in the first rotational direction. The brush roller is also secured adjacent and contacting the side surface of the bladed roller and is rotating in a second rotational direction opposed to the first rotational direction. The brush roller then deposits the carbon fibers from the brush surface of the brush roller into the mixing chamber. Simultaneously with the depositing of the carbon fibers into the mixing chamber, a thermoset resin powder from a second hopper is removed from the second hopper by a scatter roller adjacent an outlet of the second hopper. The scatter roller also directs the removed thermoset resin powder into the mixing chamber. Thereafter, the mixture is directed to flow onto the moving support belt of the double-belt press apparatus, as described above.

Accordingly, it is a general purpose of the present disclosure to provide a method of manufacturing a dry-laid precursor substrate and substrate for a fuel cell that overcomes deficiencies of the prior art.

It is a more specific purpose to provide a method of manufacturing a dry-laid precursor substrate and a substrate for a fuel cell that may be produced at a substantial cost reduction compared to wet-laid fuel cell substrates having comparable characteristics, and wherein the method also facilitates efficient use of a short-length double belt press apparatus.

These and other purposes and advantages of the present disclosure will become more readily apparent when the following description is read in conjunction with the accompanying drawings.

DESCRIPTION OF THE PREFERRED EMBODIMENTS

Figure 1:
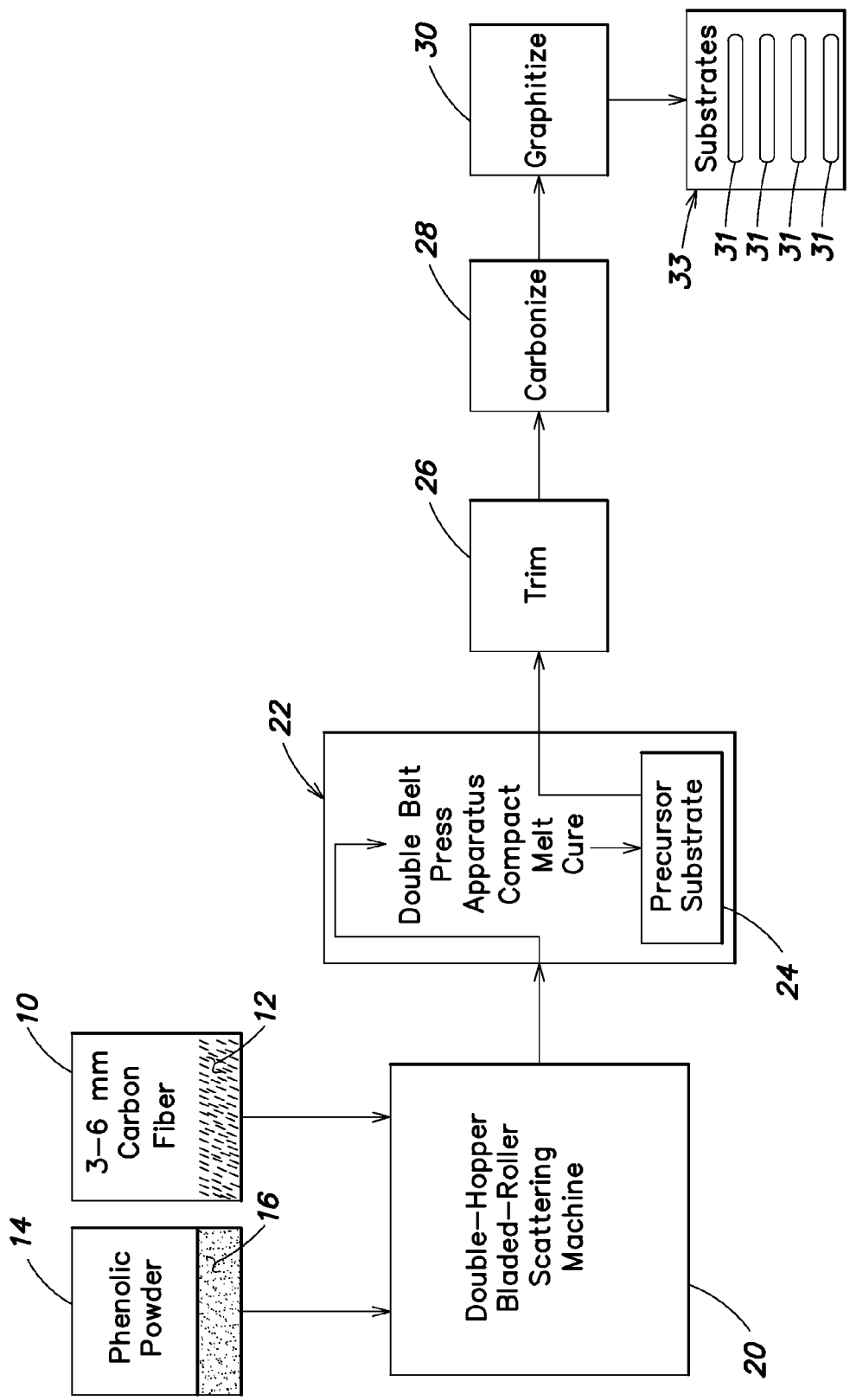
FIG. 1 is a block diagram illustrating a sequence of steps of a method of manufacturing a dry-laid fuel cell precursor substrate of the present disclosure.

Referring to the drawings in detail, a simplified schematic representation of a method of manufacture of a dry-laid fuel cell precursor substrate and substrate is shown in FIG. 1 as a sequence of activities. The method includes first loading a first hopper 10 with carbon fibers 12 having a length of between about 3 and 12 millimeters. A second hopper 14 is loaded with a thermoset resin powder 16. The carbon fibers 12 and thermoset resin powder 16 are then directed to flow into a mixing chamber 18 (shown in FIG. 2) of a double-hopper, bladed-roller scattering machine 20. The carbon fibers 12 and thermoset resin powder 16 are mixed together within the mixing chamber 18 so that a mixture 19 thereof includes between about forty percent and about sixty percent carbon fiber 12 and between about forty percent and about sixty percent thermoset resin powder 16. The mixture 19 of carbon fiber 12 and thermoset resin powder 16 is then directed to flow through a double belt press apparatus 22 so that the mixture is compacted to a predetermined thickness and heated to an adequate temperature and for an adequate time to melt and cure the thermoset resin surrounding the carbon fibers to form a precursor substrate 24 that passes out of the double belt press apparatus 22. The precursor substrate 24 is then processed for trimming at a trim station 26; for carbonizing at a carbonizing station 28; and for graphitizing at a graphitizing station 30 to form the final fuel cell substrate 31, shown stacked within a storage container 33 in FIG. 1.

The carbon fibers maybe any polyacrylonitrile ("PAN") based, pitch based or mesophase pitch based common fibers known in the art. A suitable carbon fiber for illustrative purposes is Toho grade C 451 chopped carbon fiber sold by Toho Tenax America, Inc., of Rockwood, Tenn., U.S.A. This is a PAN based carbon fiber with a nominal diameter of 7 microns.

The thermoset resin may be any thermoset resin with a carbon yield in excess of 35 percent upon carbonization. Phenolic resins are preferred because of their low cost and high carbon yield. Two-stage phenolic resins are preferred over single stage phenolic resins because of their stability in storage, their discrete melting and cure temperatures which affords processing flexibility, and the ability to add curing aids such as the well-known "hexa" to reduce cure time. It is preferred to use a two-stage thermoset resin with a discrete melting temperature and a discrete curing temperature. The discrete melting temperature permits the resin to flow to the junctions between the compressed carbon fibers due to surface tension forces prior to the resin being cured. This results in a more conductive and stronger structure. A suitable two-stage phenolic resin is grade Resafen 12-412 manufactured by Reichhold do Brasil Ltda, with offices in New York City, N.Y., U.S.A. Two parameters used to characterize thermoset reins are "flow distance" in a standard test at a reference temperature; and "cure time" again in a standard test at a reference temperature. The selected phenolic has a long flow at 1250° C. of >60 mm and a rapid cure at 154° C. of <60 seconds. The long flow is important to provide time for the molten resin to flow to the junctions between the fibers. The rapid cure is important to minimize the size of the equipment. A Double Belt Press apparatus with a melt zone that is 15 inches and a cure zone that is 15 inches (38 cm) long will produce one 20"×20" substrate per minute if the cure time for the resin is 45 seconds. This results in a very short Double Belt Press apparatus which is a significant savings in capital costs. Thermoset resin available under the product number Resafen 12-414 that is manufactured by the aforesaid Reichhold company is a suitable resin with a flow at 125° C. of 60-70 mm and a cure time at 154° C. of 39-48 seconds. One skilled in the art will use differential scanning calorimetry (DSC) to characterize the melting point temperature and cure temperature and cure time of the resin. This will facilitate the setting of the melt zone and cure zone temperatures and residence times within the double belt press apparatus.

Figure 2:
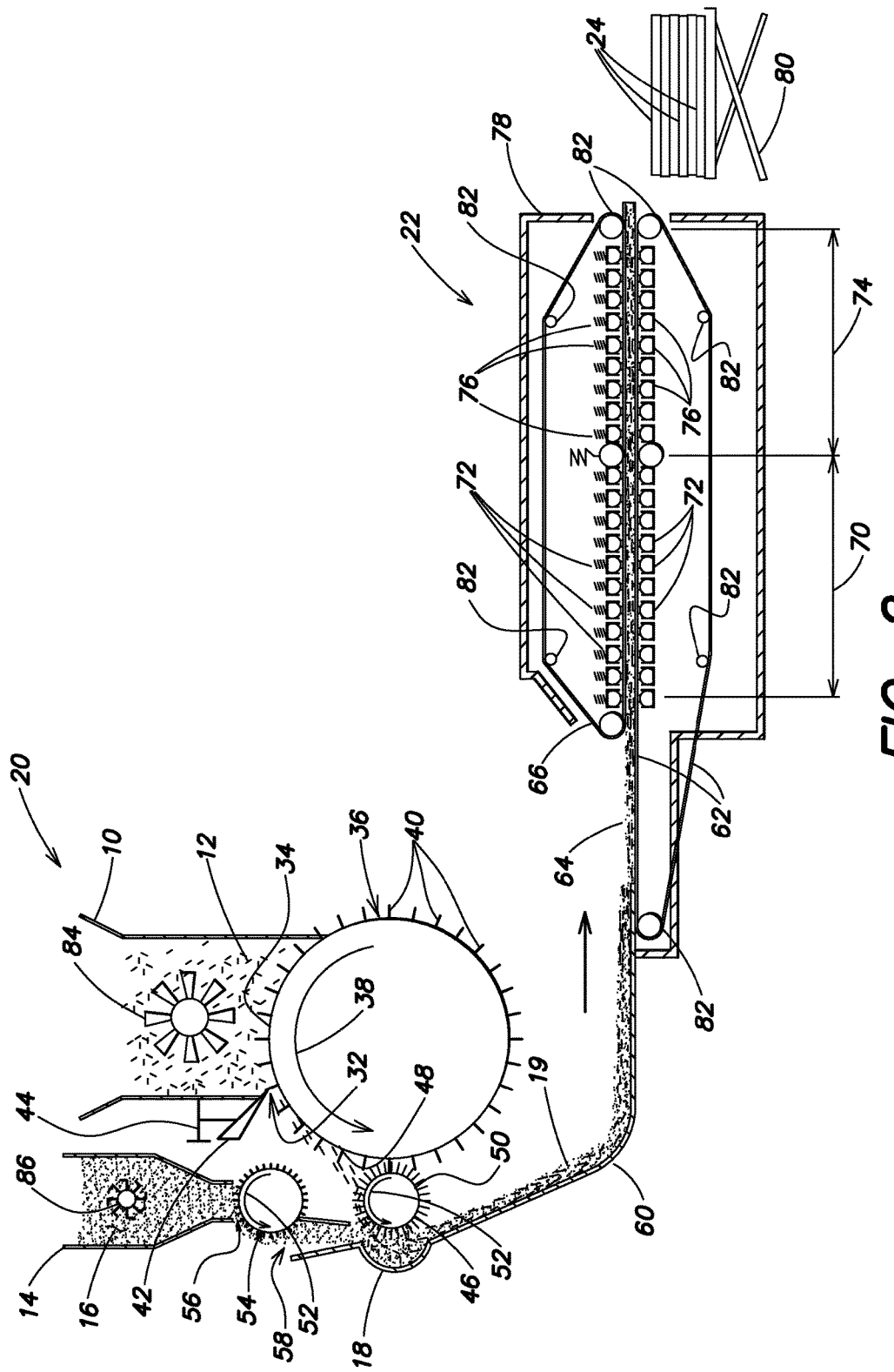
FIG. 2 is a simplified, schematic representation of a method of manufacturing a dry-laid precursor substrate and a fuel cell substrate constructed in accordance with the present disclosure.

FIG. 2 shows the aforesaid method of manufacturing the precursor substrate 24 in more detail. In particular, the double-hopper, bladed-roller scattering machine 20 includes the first hopper 10 so that the first hopper 10 holds the 3-12 mm carbon fibers 12 and the carbon fibers 12 are dispensed through an outlet 32 of the first hopper 10 onto an upper surface 34 of a rotating bladed roller 36. The upper surface 34 of the rotating bladed roller 36 is secured immediately adjacent the outlet 32 of the first hopper 10. The bladed roller 36 rotates in a first rotational direction that is represented in FIG. 2 by first directional arrow 38. The bladed roller 36 moves the carbon fibers 12 from the first hopper 10 that is disposed above the upper surface 34 of the bladed roller 36 (wherein the word "above" is to mean a direction opposite to the direction of gravity) to positions on the upper surface 34 between blades 40 on the bladed roller 36.

The carbon fibers 12 move with the bladed roller 36 in the first rotational direction 38. The double-hopper, bladed-roller machine 20 may also include a doctor blade 42 secured by an adjustment bracket 44 adjacent the outlet 32 of the first hopper 10 to regulate a flow rate of the carbon fibers 12 from the first hopper 10 onto the upper surface 34 of the bladed roller 36.

The double-hopper bladed-roller scattering machine 20 also includes a brush roller 46 that brushes the carbon fibers 12 off of a side surface 48 of the bladed roller 36 and onto a brush surface 50 of the brush roller. As shown in FIG. 2, the side surface 48 of the bladed roller 36 is disposed about ninety degrees from the upper surface 34 and in the first rotational direction 38. The brush roller 46 is also secured adjacent and contacting the side surface 48 of the bladed roller 36 and is rotating in a rotational direction, represented in FIG. 2 by reference numeral 52, that may be the same as the first rotational direction 38. The brush roller 46 then deposits the carbon fibers 12 removed from the side surface 48 of the bladed roller 36 from the brush surface 50 of the brush roller 46 into the mixing chamber 18.

Simultaneously with the depositing of the carbon fibers 12 into the mixing chamber 18 as described above, the thermoset resin powder 16 is removed from the second hopper 14 by a scatter roller 54 adjacent an outlet 56 of the second hopper 14 that may rotate in the same rotational direction 52 as the brush roller 46. The scatter roller 54 also directs the removed thermoset resin powder 16 into an inlet 58 the mixing chamber 18. A suitable double hopper scattering machine comprised of a rotary and oscillating brush system is a double applicator available as model number 057 Precision Scattering Machine manufactured by Techno Partners Samtronics GmbH (TPS) of Göppingen, Germany.

The mixture 19 of carbon fiber 12 and thermoset resin powder 16 is then directed to flow from the mixing chamber 18 onto and along a feeder trough 60 so that a predetermined amount of the mixture 19 is directed to flow from the feeder trough 60 onto a moving support belt 62 of the double belt press apparatus 22 to form a layer 64 of the mixture 19 on the moving support belt 62. Then, the mixture 19 layer 64 is compressed between the moving support belt 62 and a moving compression belt 66 of the double belt press apparatus 22 while the mixture 19 layer 64 is simultaneously heated and compressed between the support belt 62 and compression belt 66. The heated, compressed mixture 19 layer 64 resides an adequate time between the belts 62, 66 of the double belt press apparatus to first melt and then cure the thermoset resin. The cured mixture then passes out of the double belt press apparatus 22 as the precursor substrate 24.

A suitable double belt press 22 is available under the product name "ISR Double Belt Press Line" manufactured by the Hymmen Company, with offices at Hymmen North America Ltd., Bolton, Ontario, Canada. This double belt press apparatus is designed to produce a uniform thickness product in an isochoric process. Due to a design that creates an equal distance between steel bands of the support belt 62 and compression belt 66, the isochoric process creates a product with a uniform thickness that may be set by the double belt press apparatus to be a predetermined thickness. This is in contrast to an isobaric pressure system which provides an absolutely uniform pressure distribution over the width and length of the press but results in a product with a variable thickness.

The method of manufacturing the dry-laid precursor substrate 24 for a fuel cell (not shown) also includes, after passing the cured mixture 19 as the precursor substrate 24 out of the double belt press apparatus 22 and trimming the precursor substrate 24 to predetermined length and width dimensions, carbonizing resin in the precursor substrate 24. The thermoset resin in the precursor substrate is typically carbonized by heating in an inert atmosphere to 750-1000° C. as is known. Additionally, the carbonized precursor substrate is generally graphitized to improve electrical and thermal conductivities and resistance to oxidation and corrosion by heating in an inert atmosphere to 2000-3000° C. as is known in the art. This graphitizing step produces the final substrate 31.

The present method may also include compressing the layer 64 of the mixture 19 between the moving support belt 62 and a moving compression belt 66 to establish a predetermined thickness of the layer 64, and passing the layer 64 through a melt-zone 70 of the double belt press apparatus 22. The melt-zone 70 includes a first plurality of compression roller-heaters 72 disposed adjacent exterior surfaces of the support belt 62 and the compression belt 66 throughout the melt-zone 70 so that the compression roller-heaters 72 may establish a pre-determined thickness and set a predetermined temperature to the support belt 62 and compression belt 70 as the belts 62, 70 pass through the melt-zone 70. The melt-zone 70 includes moving the layer 64 of the mixture 19 during a residence time duration sufficient to heat the layer 64 above a melting temperature of the thermoset resin 16 and below the a curing temperature of the thermoset resin 16.

Additionally, the method preferably includes, after moving the layer 64 of the mixture 19 through the melt-zone 70, continuing to compress the layer 64 between the moving support belt 62 and moving compression belt 66 as the belts 62, 66 move the layer 64 through a cure-zone 74 of the double belt press apparatus 22. The cure-zone 74 is adjacent and contiguous with the melt-zone 70. The cure-zone 74 includes a second plurality of compression roller-heaters 76 disposed adjacent exterior surfaces of the support belt 62 and the compression belt 66 throughout the cure-zone 70 so that the second plurality of compression roller-heaters 76 may create a pre-determined temperature in the support belt 62 and compression belt 70 as the belts 62, 70 pass through the cure-zone 74. The method includes moving the layer 64 of the mixture 19 through the cure-zone 74 during a residence time duration sufficient to cure the thermoset resin 16, and, wherein the cure-zone 74 also includes heating the mixture passing through the cure-zone 74 to a temperature above the curing temperature of the thermoset resin 16. The double-belt press apparatus 22 may also include standard components known in the art of such machines, such as an exterior housing 78, a support rack 80 for supporting a plurality of substrates 24, a plurality of belt-rollers 82, as shown schematically in FIG. 2.

In a further embodiment, the method of manufacturing the dry-laid substrate 24 also includes agitating the carbon fibers 12 within the first hopper 10 with a moving agitator blade 84 within the first hopper 10 while dispensing the carbon fibers 12 from the first hopper 10. The method may also include agitating the thermoset resin powder 16 within the second hopper 14 with a second moving agitator blade 86 within the second hopper while depositing the thermoset resin 16 from the second hopper 14 into the mixing chamber 18.

An exemplary dry-laid substrate of the present invention may be manufactured as follows. 6 mm long Toho grade C 451 carbon fibers are loaded into the first hopper 10 of a double applicator 057 TPS precision scattering machine 20. Resafen 12-412 phenolic resin powder 16 is loaded into the second hopper 14 of the double applicator 057 TPS scattering machine 20. Carbon fibers 12 and phenolic powder 16 are simultaneously deposited into the mixing chamber 18 of the scattering machine 20 in a ratio of 45% carbon fiber 12 to 55% phenolic powder 16. The fiber-resin mixture 19 is then deposited onto the moving support belt 62 of a Hymmen ISR double belt press 22 at a nominal areal loading of 350 gm/m2. The layer 64 of the fiber-resin mixture 19 is then compressed between the moving support belt 62 and the moving compression belt 66 of the double belt press 22 to a thickness of 0.62 mm, and then heated in the melt zone 70 of the double belt press to a temperature of about 125° C. for a residence time of 1-2 minutes. Then, the layer 64 is heated in a cure zone of the double belt press to a temperature of about 154° C. for a residence time of 1-2 minutes to form a precursor substrate 24 with an areal weight of 350 gm/m2, a bulk density of 0.64 gm/cm3 and a thickness of 0.62 mm. The precursor substrate 24 is discharged from the double belt press 22 and cut into sheets (not shown). The precursor substrate 24 is carbonized in an inert atmosphere at 850° C. and graphitized in an inert atmosphere at 2700° C. resulting in the finished fuel cell substrate 31 with an areal weight of 250 gm/m², a bulk density of 0.56 gm/cm³ and a thickness of 0.45 mm.

For purposes herein, the word "about" is to mean plus or minus ten percent.

While the present disclosure has been described with respect to the illustrated method of manufacturing a dry-laid fuel cell precursor substrate 24 and substrate 31 for a fuel cell (not shown), it is to be understood that the invention is not to be limited to those descriptions and illustrations. Accordingly, reference should be made primarily to the following claims rather than the foregoing description to determine the scope of the invention.

What is claimed is:

1. A method of manufacturing a dry-laid fuel cell precursor substrate, the method comprising:
    a. dispensing carbon fibers having a length of between about 3 and 12 millimeters from a first hopper into a mixing chamber of a double-hopper, bladed-roller scattering machine, wherein the dispensing the carbon fibers into the mixing chamber includes dispensing the carbon fibers from the first hopper onto an upper surface of a rotating bladed roller rotating in a first rotational direction and brushing the carbon fibers off of a side surface of the rotating bladed roller and directly onto a brush surface of a brush roller rotating in a second rotational direction opposed to the first rotational direction, wherein the side surface of the bladed roller is about ninety degrees from the upper surface in the first rotational direction, and wherein the brush roller is adjacent to and in contact with the side surface of the bladed roller;
    b. simultaneously with the depositing of the carbon fibers into the mixing chamber, depositing a thermoset resin powder from a second hopper of the double-hopper, bladed-roller scattering machine into the mixing chamber, and mixing the carbon fibers and thermoset resin powder together;
    c. then, flowing an adequate amount of the mixture onto a moving support belt of a double belt press apparatus to form a layer of the mixture on the moving support belt;
    d. then, compressing the mixture between the moving support belt and a moving compression belt of the double belt press apparatus to a predetermined thickness while simultaneously heating the mixture and passing the compressed, heated mixture between the belts for an adequate residence time within the double belt press apparatus to first melt and then cure the thermoset resin;
    e. then, passing the cured mixture as the precursor substrate for a fuel cell out of the double belt press apparatus.

2. The method of manufacturing a dry-laid fuel cell precursor substrate of claim 1, further comprising, after passing the precursor substrate for a fuel cell out of the double belt press apparatus, trimming the substrate to predetermined length and width dimensions.

3. The method of manufacturing a dry-laid fuel cell precursor substrate of claim 1, further comprising, after passing the cured mixture as the precursor substrate for a fuel cell out of the double belt press apparatus, carbonizing the substrate by heating the precursor substrate in an inert atmosphere to between about 750 degrees Celsius and about 1000 degrees Celsius.

4. The method of manufacturing a dry-laid fuel cell precursor substrate of claim 3, further comprising graphitizing the carbonized substrate by heating the carbonized substrate in an inert atmosphere to between about 2000 degrees Celsius and about 3000 degrees Celsius to form a substrate for a fuel cell.

5. The method of manufacturing a dry-laid fuel cell precursor substrate of claim 1, wherein the compressing the mixture between the moving support belt and a moving compression belt of the double belt press apparatus further comprises compressing the mixture to a predetermined thickness between the moving support belt and moving compression belt through a melt-zone of the double belt press apparatus so that the mixture passes through the melt zone for a residence time duration that is sufficient to heat the mixture to a temperature above a melting temperature of the thermoset resin and below a curing temperature of the thermoset resin, and so that the mixture passes through the melt zone for a sufficient residence time duration to melt the thermoset resin.

6. The method of manufacturing a dry-laid fuel cell precursor substrate of claim 5, wherein the compressing the mixture between the moving support belt and a moving compression belt of the double belt press apparatus further comprises, after moving the mixture through the melt-zone, continuing of compressing the mixture to a predetermined thickness between the moving support belt and moving compression belt through a cure-zone of the double belt press apparatus, wherein the cure-zone is adjacent and contiguous with the melt-zone and the cure-zone, and so that the mixture passes through the cure zone for a residence time duration that is sufficient to heat the mixture to a temperature above the curing temperature of the thermoset resin and so that the mixture passes through the cure zone for a sufficient residence time duration to cure the thermoset resin.

7. The method of manufacturing a dry-laid fuel cell precursor substrate of claim 1, further comprising agitating the carbon fibers within the first hopper with a moving agitator blade within the first hopper while dispensing the carbon fibers from the first hopper.

8. The method of manufacturing a dry-laid fuel cell precursor substrate of claim 7 further comprising agitating the thermoset resin powder within the second hopper with a moving agitator blade within the second hopper while depositing the thermoset resin from the second hopper.

9. A method of manufacturing a dry-laid fuel cell substrate, the method comprising:
   a. dispensing carbon fibers having a length of between about 3 and 12 millimeters from a first hopper onto an upper surface of a rotating bladed roller, wherein the upper surface of the rotating bladed roller is secured immediately adjacent an outlet of the first hopper, wherein the bladed roller rotates in a first rotational direction moving the carbon fibers between blades on the bladed roller in the first rotational direction;
   b. brushing the carbon fibers off of a side surface of the bladed roller and directly onto a brush surface of a brush roller, wherein the side surface of the bladed roller is about ninety degrees from the upper surface in the first rotational direction, wherein the brush roller is disposed adjacent and contacting the side surface of the bladed roller and is rotating in a second rotational direction opposed to the first rotational direction;
   c. depositing the carbon fibers from the brush surface of the brush roller into a mixing chamber;
   d. simultaneously with the depositing of the carbon fibers into the mixing chamber, depositing a thermoset resin powder from a second hopper into the mixing chamber and mixing the carbon fibers and thermoset resin powder together so that the mixture includes between about forty percent and about sixty percent carbon fiber and between about forty percent and about sixty percent of thermoset resin powder;
   e. then depositing an adequate amount of the mixture on to a moving support belt of a double belt press apparatus to form a layer of the mixture on the moving support belt;
   f. then, compressing the mixture to a predetermined thickness between the moving support belt and a moving compression belt of the double belt press apparatus while simultaneously heating the mixture and passing the compressed, heated mixture between the belts for an adequate residence time to first melt and then cure the thermoset resin;
   g. then, passing the cured mixture as a precursor substrate out of the double belt press apparatus and trimming the precursor substrate to predetermined length and width dimensions;
   h. then, carbonizing the trimmed precursor substrate; and,
   i. then, graphitizing the carbonized precursor substrate to form the fuel cell substrate.

10. The method of manufacturing a dry-laid fuel cell precursor substrate of claim 9, wherein the compressing the mixture between the moving support belt and a moving compression belt of the double belt press apparatus further comprises compressing the mixture to a predetermined thickness between the moving support belt and moving compression belt through a melt-zone of the double belt press apparatus so that the mixture passes through the melt zone for a residence time duration that is sufficient to heat the mixture to a temperature above a melting temperature of the thermoset resin and below a curing temperature of the thermoset resin, and so that the mixture passes through the melt zone for a sufficient residence time duration to melt the thermoset resin.

11. The method of manufacturing a dry-laid fuel cell precursor substrate of claim 10, wherein the compressing the mixture between the moving support belt and a moving compression belt of the double belt press apparatus further comprises, after moving the mixture through the melt-zone, continuing compressing the mixture to a predetermined thickness between the moving support belt and moving compression belt through a cure-zone of the double belt press apparatus, wherein the cure-zone is adjacent and contiguous with the melt-zone and the cure-zone, and so that the mixture passes through the cure zone for a residence time duration that is sufficient to heat the mixture to a temperature above the curing temperature of the thermoset resin and so that the mixture passes through the cure zone for a sufficient residence time duration to cure the thermoset resin.

12. The method of manufacturing a dry-laid fuel cell substrate of claim 9, wherein carbonizing the trimmed precursor substrate further comprises heating the precursor substrate in an inert atmosphere to between about 750 degrees Celsius and about 1000 degrees Celsius.

13. The method of manufacturing a dry-laid fuel cell substrate of claim 9, wherein graphitizing the carbonized precursor substrate further comprises heating the carbonized substrate in an inert atmosphere to between about 2000 degrees Celsius and about 3000 degrees Celsius.

14. The method of manufacturing a dry-laid fuel cell substrate of claim 9, further comprising agitating the carbon fibers within the first hopper with a moving agitator blade within the first hopper while dispensing the carbon fibers from the first hopper.

15. The method of manufacturing a dry-laid fuel cell substrate of claim 14, further comprising agitating the thermoset resin powder within the second hopper with a moving agitator blade within the second hopper while depositing the thermoset resin from the second hopper.

16. The method of manufacturing a dry-laid fuel cell substrate of claim 9, further comprising securing an doctor blade adjacent the outlet of the first hopper and between the outlet and blades of a bladed roller of the double-hopper bladed-roller scattering machine, and regulating with the doctor blade flow of the carbon fibers from the first hopper onto the upper surface of the bladed roller.

* * * * *